US009930167B2

(12) United States Patent
Bruno

(10) Patent No.: US 9,930,167 B2
(45) Date of Patent: Mar. 27, 2018

(54) MESSAGING APPLICATION WITH IN-APPLICATION SEARCH FUNCTIONALITY

(71) Applicant: Verizon Patent and Licensing Inc., Arlington, VA (US)

(72) Inventor: Sean F. Bruno, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 325 days.

(21) Appl. No.: 14/324,563

(22) Filed: Jul. 7, 2014

(65) Prior Publication Data
US 2016/0006856 A1    Jan. 7, 2016

(51) Int. Cl.
| | | |
|---|---|---|
| *H04M 1/725* | (2006.01) | |
| *H04W 4/12* | (2009.01) | |
| *G06F 17/30* | (2006.01) | |
| *G06F 3/0484* | (2013.01) | |
| *G06F 3/0481* | (2013.01) | |

(52) U.S. Cl.
CPC ...... *H04M 1/72547* (2013.01); *G06F 3/0481* (2013.01); *G06F 3/0484* (2013.01); *G06F 17/30884* (2013.01); *H04M 1/72552* (2013.01); *H04W 4/12* (2013.01)

(58) Field of Classification Search
CPC .......... H04M 1/72547; H04M 1/72552; G06F 15/17306; G06F 17/30864; H04L 51/04
See application file for complete search history.

(56) References Cited

U.S. PATENT DOCUMENTS

| | | | | |
|---|---|---|---|---|
| 8,074,172 | B2 * | 12/2011 | Kocienda | G06F 3/0237 715/255 |
| 8,204,897 | B1 * | 6/2012 | Djabarov | G06F 17/30705 707/767 |
| 8,438,148 | B1 * | 5/2013 | Rakowski | G06F 17/30864 707/706 |
| 8,583,672 | B1 * | 11/2013 | Paskin | G06F 17/3064 707/765 |
| 8,798,250 | B1 * | 8/2014 | Li | H04M 3/42 379/201.01 |

(Continued)

OTHER PUBLICATIONS

Arnold Robbins, Learning the vi and Vim Editors, 2009, 7th Edition.*

*Primary Examiner* — Abdullah Al Kawsar
*Assistant Examiner* — Sean Hsiao

(57) ABSTRACT

The disclosure provides examples of a messaging application search service in which a search is performed from a messaging application for content to be incorporated into a message being composed using the messaging application. The messaging application responds to a search function indicator to provide a search function without leaving the messaging application. The search function indicator is interpreted by the messaging application as a request for a search to be performed by a search application. Upon receipt of the search request, the messaging application allows search terms to be entered in a messaging application user interface for subsequent search by the search application. Returned search results are presented to the user within the messaging application to allow the user to incorporate a search result into a message being composed via the messaging application.

20 Claims, 8 Drawing Sheets

(56) References Cited

U.S. PATENT DOCUMENTS

| | | | |
|---|---|---|---|
| 2009/0007001 A1* | 1/2009 | Morin | G06F 3/0237 |
| | | | 715/773 |
| 2009/0088218 A1* | 4/2009 | Kim | G06F 3/0481 |
| | | | 455/566 |
| 2009/0174667 A1* | 7/2009 | Kocienda | G06F 3/0237 |
| | | | 345/169 |
| 2011/0201387 A1* | 8/2011 | Paek | G06F 3/0237 |
| | | | 455/566 |
| 2012/0011202 A1* | 1/2012 | Occhino | H04L 67/16 |
| | | | 709/204 |
| 2012/0131032 A1* | 5/2012 | Rakshit | G06F 17/30873 |
| | | | 707/767 |
| 2012/0290967 A1* | 11/2012 | Scott | G06F 17/30967 |
| | | | 715/780 |
| 2013/0212515 A1* | 8/2013 | Eleftheriou | G06F 3/04886 |
| | | | 715/773 |
| 2014/0040285 A1* | 2/2014 | Rubinstein | G06F 17/3053 |
| | | | 707/751 |
| 2014/0156762 A1* | 6/2014 | Yuen | H04L 51/32 |
| | | | 709/206 |
| 2014/0244243 A1* | 8/2014 | Kim | G06F 17/276 |
| | | | 704/9 |
| 2015/0026604 A1* | 1/2015 | Mulukuri | G06Q 50/01 |
| | | | 715/758 |
| 2015/0100537 A1* | 4/2015 | Grieves | G06N 5/048 |
| | | | 706/52 |
| 2015/0127753 A1* | 5/2015 | Tew | G06Q 30/0251 |
| | | | 709/206 |
| 2015/0317069 A1* | 11/2015 | Clements | G06F 3/0237 |
| | | | 715/773 |

* cited by examiner

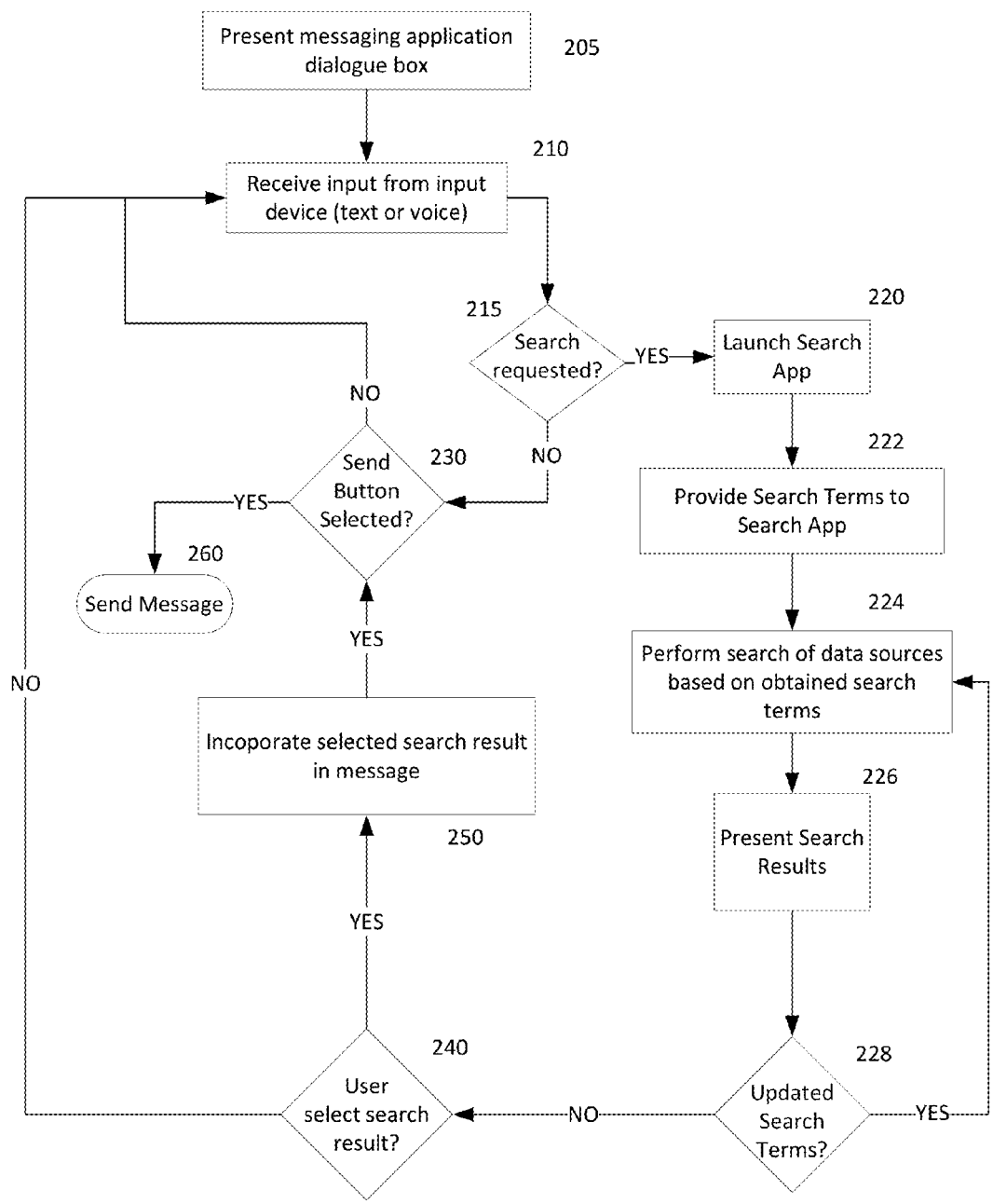

MESSAGING APPLICATION WITH IN-APPLICATION SEARCH FUNCTIONALITY

BACKGROUND

In recent years, mobile messaging has increased as a form of communication between mobile device users. Messaging applications are typically provided as part of a suite of software applications by the mobile device manufacturer, but there are also third-party messaging applications available from on-line app stores. The messaging applications may execute according to messaging protocols that allow for exchanging not only text messages, but multimedia messages as well. The multimedia messages can include images, videos, audio, graphics, and similar forms of media content.

In order to incorporate the media content into a mobile message using known messaging applications, the user must leave the messaging application. From the messaging application, the user can either exit the messaging application and launch another application (e.g., data search or file management), or the user might press an attach control input (i.e., a button) in the messaging application to launch a menu of applications containing data available for incorporation into the mobile message. In either case, the user must leave the mobile messaging application to find content to incorporate into a message the user is composing.

After leaving the mobile messaging application, the user may be required to make additional inputs and selections in multiple screens presented on the mobile device in order to obtain the media content desired for inclusion in the mobile message being composed. This is not only time consuming, but also may be distracting and/or frustrating to the user.

Hence a need exists for an alternative to leaving the mobile messaging application in order to incorporate media content into a mobile message.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a flowchart of an example of a messaging application search process.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a messaging application search function or service that facilitates simpler and more efficient searching for content and incorporating search results containing content into a message that is composed and sent using to messaging application on a mobile device. Examples of messages that may be sent by a messaging application include short messaging service (SMS) messages, enhanced messaging service (EMS) messages and/or multimedia message service (MMS) messages. The disclosed examples provide a messaging application that allows input of search terms into a dialogue box converted to a search bar for subsequent search and retrieval of search results based on the text input into the dialogue box, all from within the user interface presented by the messaging application. For example, a user may be composing a message, and may wish to incorporate some form of content, such as, for example, a quote, a video clip, an image, a website link (i.e., uniform resource locator (URL)), a photo or the like, in the body of the message.

Reference now is made in detail to the examples illustrated in the accompanying drawings and discussed below.

Figure 1:
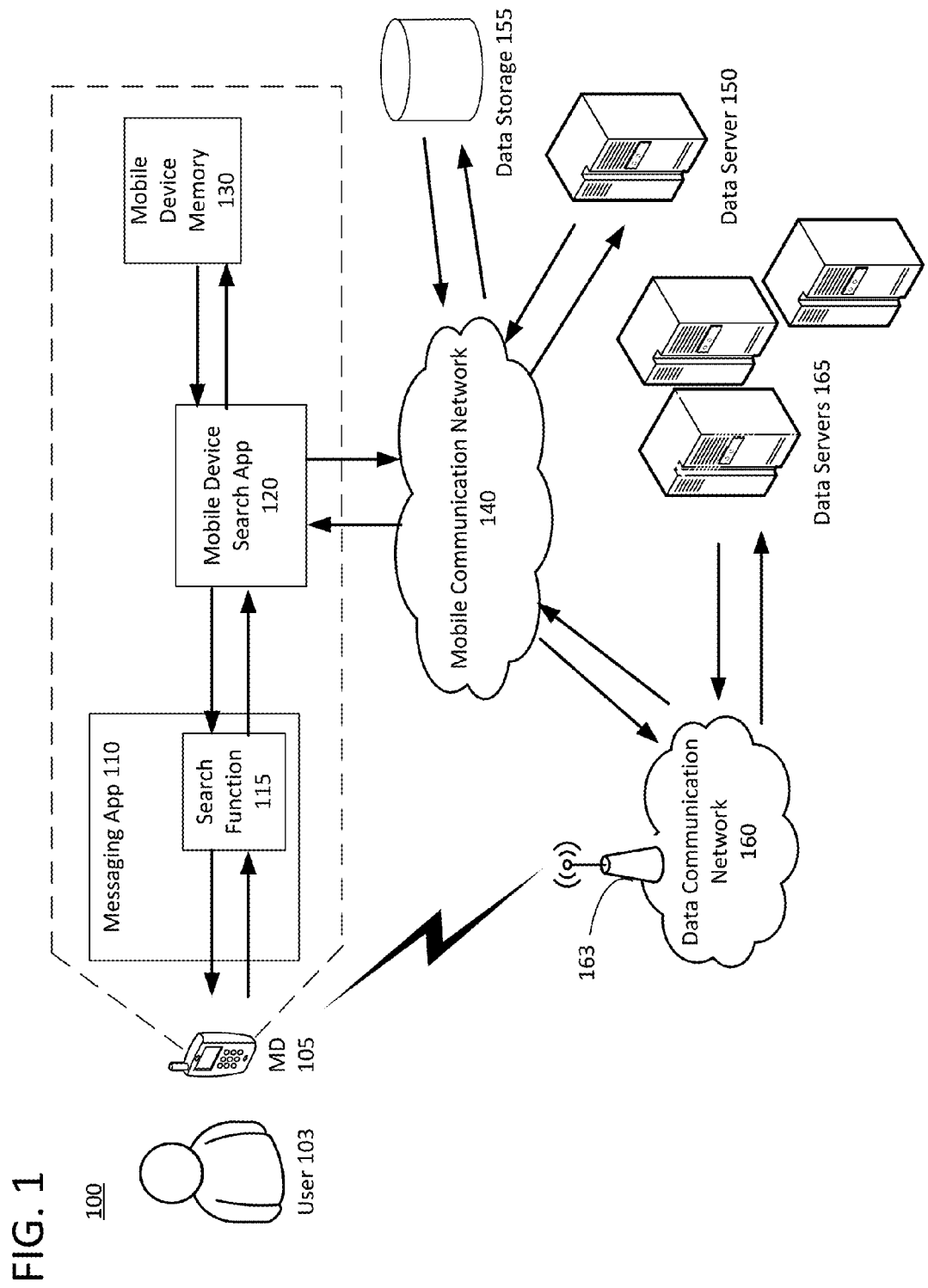
FIG. 1 is a high-level functional block diagram of an example of a system of networks/devices that provide various communications for mobile devices and support an example of the messaging application search service.

FIG. 1 is a high-level functional block diagram of an example of a system 100 of networks/devices that provide various communications for mobile devices and support an example of the messaging search service. The system 100 of FIG. 1 shows a mobile device (MD) 105 communicatively coupled to mobile communication network 140. The MD 105 may be a laptop, a personal digital assistant ("PDA"), a smartphone, a tablet PC, a portable game or media player with wireless communication elements or other portable device designed to communicate via one or more wireless networks. The mobile communication network 140 is communicatively coupled to a data server 150, a data storage device 155, a data communication network 160 and a data server 165.

The mobile communication network 140 may operate under control of a mobile network operator, or, said differently, a cellular communications carrier. The user 103 may subscribe to the MNO for voice and data communications services. For example, the mobile device 105 may be configured to receive voice and data communications services via the mobile communication network 140, and the mobile device 105 may deliver the voice and data communications services to the user 103. As a subscriber to services from the mobile communication network 140, the user 103 may be able to store and access data on the data storage device 155 or one or more servers 150 or 165 via the mobile device 105.

The data storage device 155 may be provided by the MNO, and is connected to the mobile communication network 140, and may store information, such as audio, video, images, documents, e-mails, voicemails, text messages, purchased digital media items and other forms of data. For example, as part of the subscription to voice and data communication services, the MNO may provide the user 103 with a limited amount of data storage capacity. The user 103 (i.e., a subscriber) may access any of the stored information via the mobile device 105 and/or other devices (e.g., a tablet, laptop or personal computer).

The data server 150 may be provided by the MNO, and is shown connected to the mobile communication network 140. The mobile device 105 may also be able to obtain digital media content from the data server 150 via the mobile communication network 140. For example, the MNO may also be a content provider, and the user 103, as a subscriber, may access digital media content from the MNO's data server 150 via the mobile device 105. While the data storage device 155 provides data storage specific to the subscribing user 103, the data server 150 may, depending upon the user's subscription, provide data services, such as access to the Internet, document services, or the like, and/or digital content, such as e-books, videos, audio, streaming media and the like.

The user 103 may also subscribe to third-party service providers (e.g., digital media content providers that may provide digital media content (e.g., e-books, blogs, articles, music or video services), data providers (e.g., news sources, investment sources and the like), and the like. Data may be obtained from the third-party service providers from one or more data servers 165 via the data communication network 160. For example, the data communication network 160 be implemented as a digital communications network such as that of a cable television/Internet provider that supports wireless connectivity, e.g. via Wi-Fi access points 163, such as the Internet, or similar network. The data communication network 160 also provides the mobile device 105 with access to websites that provide data to the mobile device 105.

For example, the mobile device 105 (the details of which are described in more detail with reference to FIG. 4) may include a processor (not shown in this example) that provides a messaging application (app) 110 that includes a search function 115, a mobile device search application (app) 120 and a mobile device memory 130. The search application 120 may be used separately from the messaging app 110, and vice versa. For example, the user 103 may launch the search app 120 to search for data in the morning, and may launch the messaging app 110 to communicate with a family member in the evening later in the same day. Said differently, the use of either application does not preclude the use of the other application. As shown in FIG. 1, the messaging app 110 may receive user inputs via a graphical user interface (not shown) presented on the mobile device 105. The mobile device search application 120 may be any one or more of search engines/applications suitable for use on a mobile device. The search engine/application may be a mobile device manufacturer-provided search engine, a third-party search engine, a mobile network operator provided or approved search engine, or the like.

The messaging app 110 and/or the search app 120 may be written in software languages such as Java, Objective C++, C#, C++, Boo or the like. The messaging app 110 and/or the search app 120 may also be native to the operating system (OS) of the mobile device 105, and/or may run in cooperation with the mobile device OS. In addition, an application programming interface (API) may be provided that facilitates the interaction between the messaging app 110 and the search app 120 by making available respective specifications and routines for the control and the exchange of data between the apps. In the example of FIG. 1, the mobile device search app 120 is shown communicating with mobile communications network 140. The communication between the search app 120 and the mobile communications network 140 may be direct or may be through other applications that are not shown in the example. For example, the search app 120 may use a web browser application (not shown) or other application suitable for communicating with the mobile communication network 140 or other network. In addition, the mobile device 105 may include a radio transceiver, such as a Wi-Fi transceiver (shown in FIG. 4), in addition to a radio transceiver capable of communicating with the mobile communication network 140. For example, in some instances, the mobile device search app 120 may communicate via the Wi-Fi transceiver directly with the data communication network 160 without having to communicate through the mobile communication network 140.

Some of the user inputs may be requests for searches to be performed by the mobile device search app 120 from within the messaging app 110. A search request may include a search function indicator and a search term(s). A search indicator may be input characters, such "$S", "??", or a specialty key provided for use with the messaging app 110, that signals the users desire to have a search performed, which are input via a keyboard or other input device, such as a microphone (both of which are described in more detail in another example). The search function indicator may cause the messaging app 110 to call the search function 115 to which the messaging app 110 passes the search term(s). The search function 115 passes the search term(s) to the mobile device search app 120. The mobile device search app 120 may receive the inputted search term(s) from the search function 115. The mobile device search app 120 may be configured to access one or more data sources based on default settings of the search app 120 or user preference settings made to the search app 120. A data source may be a memory location within the memory of the mobile device or may be a data source external to the mobile device, such as a website, a server, a cloud memory location, or the like. The order in which the search app 120 accesses the data sources may be prioritized based on default settings, by user preferences, or manner of selecting search. For example, the search app 120 may first access a memory location within the mobile device memory 130. The mobile memory (not shown in this example) location may store search results that were selected by the user 103 from previous searches. In addition, the mobile device memory 130 stores images and documents obtained from various sources, such as a camera, as an attachment in an e-mail from an e-mail application, or the like. After searching the mobile device memory, whether search results were returned or not, the search app 120 may search a data source external to the mobile device. In another example, the manner of selection of the search prioritizes the data source. For example, if the user begins a search query with "?cam" a search of images may be performed, if "?doc" is input a search of documents may be performed or different character or soft key selection (as opposed to character selection) may indicate different sources or order of search of the data sources. Similarly, or in another example, the user, when setting up the messaging application search service, may be provided with a user preferences selection menu from which the user may select or input custom inputs for performing a number of different functions associated with the messaging application search service. For example, the user may set specific character sets or symbol sets for initiating the search (e.g., "$S", "??" as mentioned above), but may select "ZZ" or other combinations of characters. Or, the user may record a voice command that is used during a voice input to the messaging application. For example, while dictating a message to the messaging application, the user may have a search-initiation voice command of "present search bar" or just "search bar", and the search bar will be presented to the user and any subsequent voice inputs will be considered search terms. To signal to the application that the search term is complete, the voice command to commence the search may be set as "go fetch," "now search," or the like. In this example, the user preference settings include a custom textual search initiation command, a custom voice search initiation command and a custom voice search commencement command. Of course, other user preferences may be selected, such as the data source selection discussed above, but also the number of search results to return and so on.

The messaging application search service may also be pre-configured to respond to gestures input to the mobile device user interface or other input device (e.g., camera or microphone), or may allow user preference settings to customize the gestures. For example, when the messaging application is active, shaking the device may cause the search function to initiate, moving the device in the shape of the letter "S" or the like. In the example, when the messaging application is active, the touch screen may interpret a single (double) touch with motion in the shape of a letter "S" as a command for initiation of a search. Of course, other inputs may be used to initiate, halt or terminate the search functionality.

Using the search term(s), the mobile device search app 120 may first, before attempting to search an external source, access the mobile device memory 130 for data related to the search term(s). After attempting to, but failing to identify data related to the search term(s), or after identifying data in the mobile device memory 130 matching the search terms, the mobile device search app 120 may access the mobile communication network 140 to obtain information from the data server 150 or to gain access to the data communication network 160 and data servers 165. Based on the search terms and search algorithm of the search app 120, the search app 120 returns search results to the search function 115. The search results are presented to the user 103 on a display device (not shown) of mobile device 105. The search request, search process and interaction of different components of the system 100 will be described in more detail with reference to FIGS. 2-4.

FIG. 2 is a flowchart of an example of a search process executed from a dialogue box of a messaging application. The process 200 is described with respect to a mobile device, but may also be provided in a device with a chat dialogue box, such as a device may be a laptop computer, tablet or the like. In addition to the flowchart of FIG. 2, the examples of FIGS. 3A and 3B will be referenced to provide examples of the concepts discussed in certain steps of the process 200.

Figure 3A:
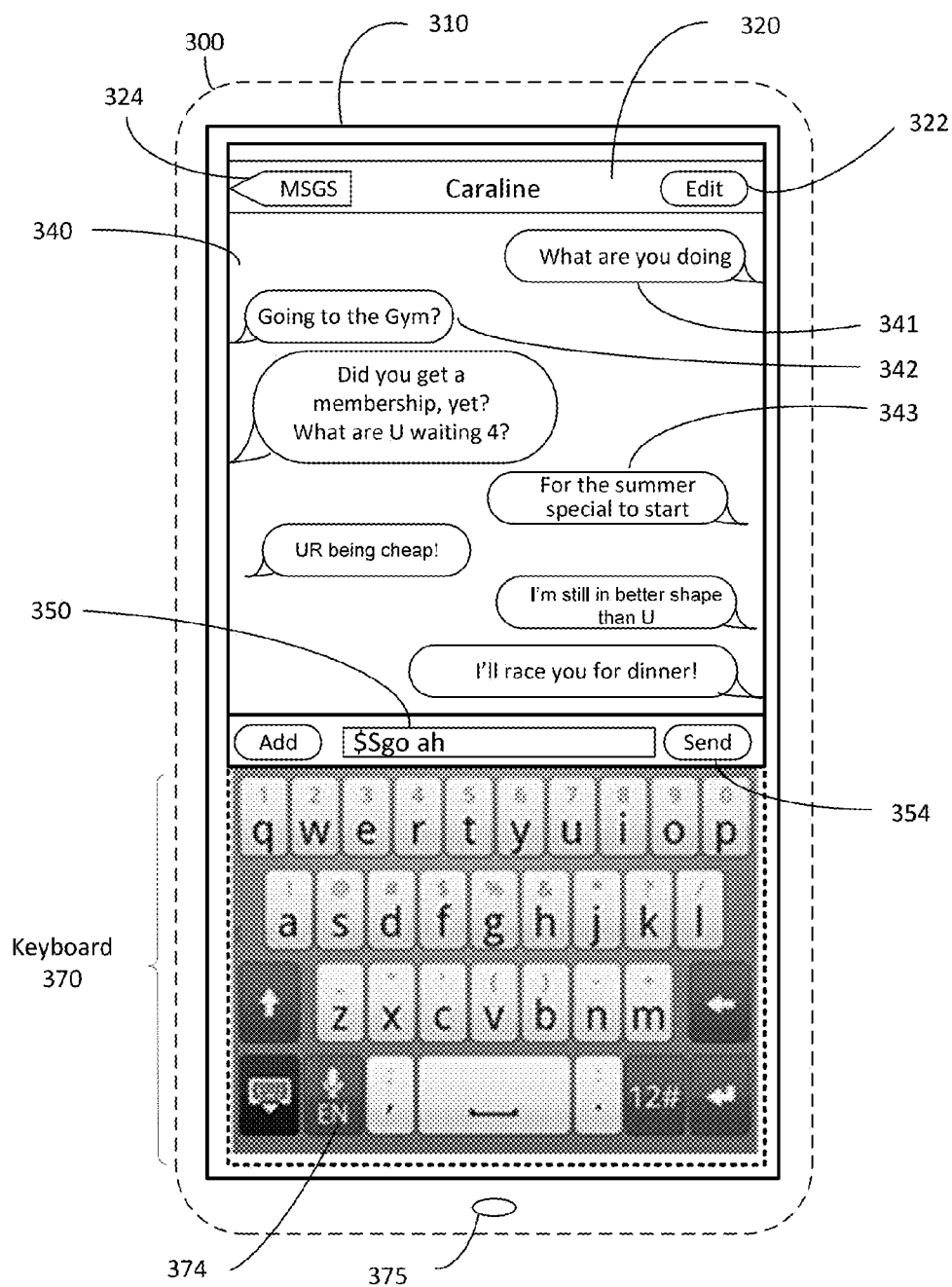
FIG. 3A is an example of a screen presentation generated by an example of the messaging application search service described herein.

However, before discussing the flowchart of FIG. 2, it may be appropriate to provide a context for the search process example by discussing the presentation of the messaging application to the user shown in FIG. 3A. FIG. 3A is an example of a user interface that is a screen presentation generated by an example of the messaging application search service that illustrates an example of an on-going chat between a user 103 and another person, Caraline. In the example, the user interface as described herein is the portion of the display 310 that is shown above the keyboard 370 regardless of whether keyboard 370 is a physical keyboard on the mobile device 300 or a virtual keyboard presented on a touchscreen display (as described in more detail with reference to FIG. 4). The user inputs characters and symbols into the messaging application or the respective input spaces (e.g., search bar) of the user interface using the keyboard 370. The mobile device 300 of FIG. 3A includes a display screen 310 that is presenting the user interface of a messaging application. The messaging application user interface includes a number of information areas.

For example, at the top of the messaging application user interface is a menu bar 320. The menu bar 320 identifies the person or entity (i.e., the contact) with whom the messaging application is messaging, or preparing to message. The menu bar also includes control buttons 324 (labeled "MSGS") and 322 (labeled "Edit") for respectively returning to messages from other persons or entities and for editing information related to the listed person or entity (i.e., contact). Individual messages, such as messages 341, 342 and 343, may also be presented on the display device 310 in a thread portion 340 of the user interface. When a user wants to send a message, via the messaging application, the user enters characters (e.g., letters, numbers, symbols, punctuation marks, and the like) by interacting with an input device, such as keyboard 370, which may be presented in a display device 310 (e.g., when implemented as via a touchscreen), or via a microphone 375.

The microphone 375 may be activated as the input device in lieu of the keyboard 370 by user interaction with keyboard button 374. In response to the selection of the keyboard button 374, the mobile device 300 may activate a voice recognition function (not shown) that recognizes the voice inputs and populates the dialogue box 350 with text that corresponds to the voice recognition application's recognition of the voice inputs. The keyboard 370 may also be implemented as a keypad, which has hard keys that substantially resembles the keyboard 370 and performs similar functions. The results of the user interaction with the input device are presented in a dialogue box 350. The dialogue box 350 is an area of the display device 310 in which the inputted characters are presented to the user indicating that the messaging application has received the presented characters as inputs. Characters may be, for example, letters (of any language supported by the mobile device 300), numbers, symbols, punctuation marks, mathematical symbols, alphanumeric, and the like.

As an initial step, the messaging application is launched, and based on user navigation within the messaging application one or more messages from a contact are presented, at 205, with a dialogue box for inputting text to the messaging application as shown in FIG. 3A. The input text (shown, for example, as "$Sgo ah" in FIG. 3A) may be obtained from a user input device, such as a keyboard or a microphone, and presented in the dialogue box 350. The dialogue box 350 receives the input from the input device (210). The messaging application may parse the received input to determine whether the input is an indicator that the user is requesting a search function. The search function indicator may be a combination of characters, such as a "$S", "*S", some other combination of special character and another character, or the like. Or, if voice input, the search function indicator may be the spoken term "Search [Search Engine Name]," "dollar sign search", or some other phrase or combination of terms. The user may, for example, set the search function indicator(s) via user preference settings for the messaging application. Alternatively, the messaging application may have a default search function indicator. At 215, the messaging application determines whether the dialogue box contains a search function indicator. Referring again to the example of FIG. 3A, the dialogue box 350 contains the inputted characters "$Sgo ah," which, for the sake of continuing the example, the messaging application receives the inputted character string, parses the character string, and determines that the combination of input characters "$S" is a search function indicator, and further determines that the letters following (i.e., "go ah") the search indicator "$S" is the requested search term. At this time, it should be noted that the search term does not have to immediately follow the search indicator as shown in FIG. 3A, but may be after the messaging app determines that user is requesting a search to be performed from within the messaging application or, in other words, the search term may be added subsequent to the entry of the search function indicator. The input character string may be an American Standard Code for Information Interchange (ASCII) character string. The messaging application may further parse the input characters to identify the search term(s), which may appear immediately after the search function indicator.

Alternatively, the search terms may include additional information that is input by the user to assist the search application by narrowing the types of content to search. For example, after identifying the search function indicator, the messaging application may present a prompt for more information about the search term, such as a content type identifier, which may be represented by predefined identifiers, such as GIF (for images), VIDEO (for video), TEXT (for text), and the like, or a particular search domain(s), such as a specific website, a specific data location (e.g., a user's cloud storage), a file in the mobile device memory, or the like.

Returning to the discussion of FIG. 2, the received input is interpreted by the messaging app to identify a search function indicator (e.g., in the present example, $S), the presence of which is further interpreted as a user request for performing a search. Upon determining that a search is requested at 215, the messaging application may invoke a search function (e.g., search function 115), or some other operation, to facilitate the launch of the search application and to facilitate messaging application communications with the mobile device search application (220). For example, the search function 115 may be a process or service executing on the mobile device processor that calls the mobile device search application, establishes a connection with the mobile device search application 120, and passes the search terms to the mobile device search application (222). In response to an input device selection, such as selection of the search button 399 in FIG. 3B, the search terms are passed to the search application. For example, the messaging application may detect a predetermined period of time during which no inputs are received via an input device, and, based on the lack of inputs determines that the search term is complete. In another example, a prompt may be presented on a display device requesting confirmation that the search term is completed. The search application may also provide suggested search terms based on prior user searches (which may be stored in the mobile device memory) or based on data received from the networks 140 or 160.

In response, the mobile device search application processes the search terms based on a search algorithm (224). For example, the search application may use a preselected search engine (e.g., Google®, Bing® or Yahoo®) to search the Internet using the selected or inputted search term. In another example, a particular web site (i.e., one type of data source) may be indicated by the user via a specific selection of the web site (or specific type of data source), or by predetermined user preferences, for searching. In yet another example, a specific data source, such as a file(s) on the mobile device or cloud storage may be indicated as a location(s) for performing a search. When setting up the messaging application search service, a user, for example, may be presented with a menu of data sources from which the user may a specific data source (e.g., a specific web site), a file in the mobile device (e.g., images or sounds), or the like.

Upon completion of the search or while the search is on-going, search results are returned (explained in more detail with respect to FIG. 3C) from the search for presentation in the dialogue box (226) in the form of a menu.

Figure 3B:
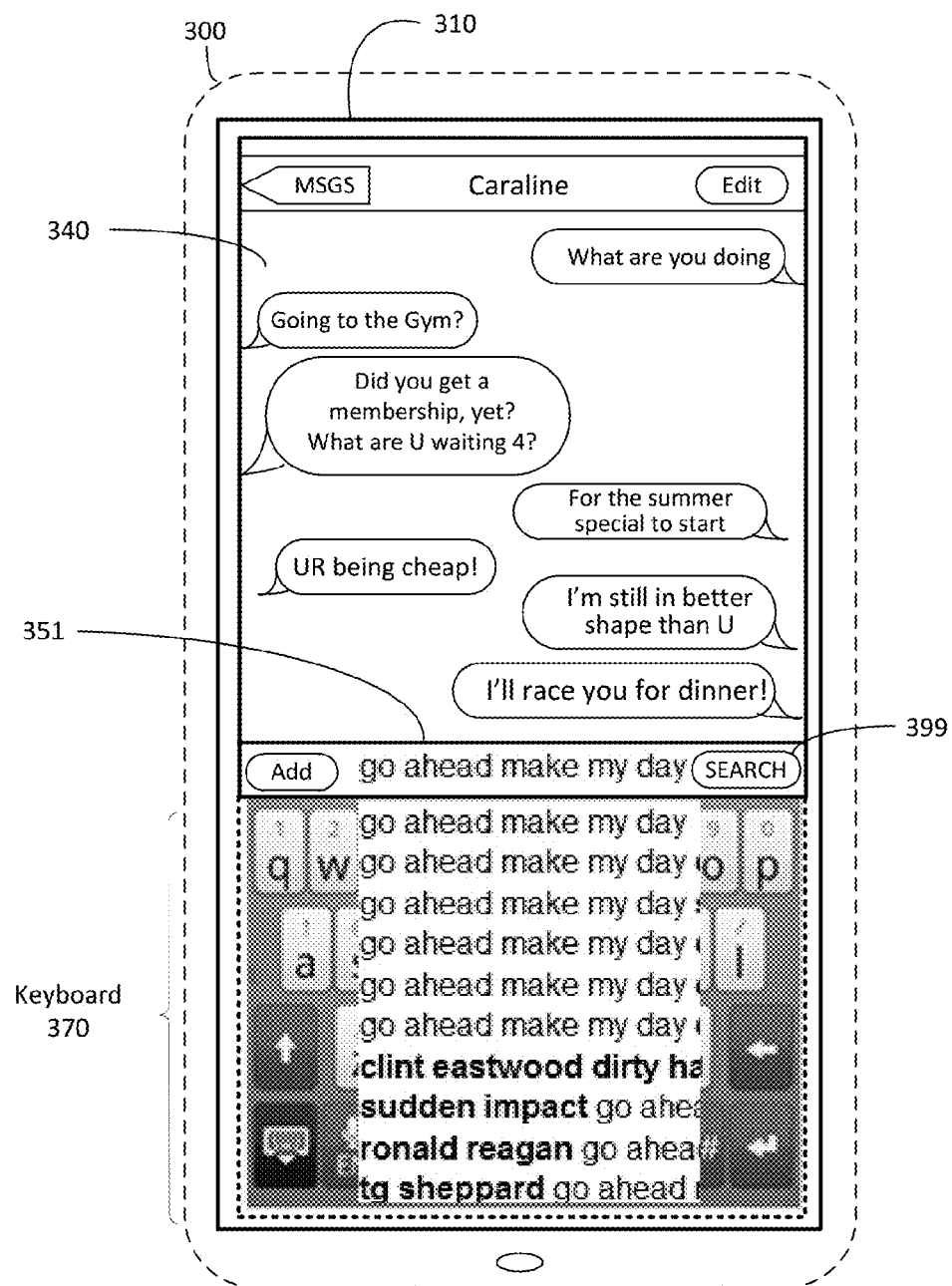
FIG. 3B is another example of a screen presentation generated by an example of the messaging application search service described herein.

Note that the search terms may be updated so long as the messaging application continues to receive inputs from the input device. As shown in FIG. 3B, suggested search searches are presented in search bar 351. The received inputs are passed by the search function to the search application, and presented in the dialogue box. So, for example, the search terms "go ah" of FIG. 3A are initially input via the input device, but the user continues to add characters to the search term, such as "go ahea," in which case, the search function passes the updated search term to the search function. As a result, the process 200 checks to see if the search terms have been updated at 228. For example, the messaging app may monitor the input devices for further inputs. If the determination is "Yes," there are further inputs, steps 224 and 226 are repeated until no further updates are identified at 228. After which, the process 200 proceeds to 240, where a determination is made whether the user has selected a search result from the search results presented at 226. If the determination at 240 is "YES," which indicates the user selected a search result, the search result is incorporated into a message being composed by the messaging application (250). The presentation of search results and subsequent selection/non-selection of a search result will be described in more detail with reference to FIG. 3C. After the search result is incorporated into the message, a determination is made at 230 whether the send button, which instructs the messaging application to send the message to the contact, has been selected. If the response to the determination, at 230, is "YES," the process 200 proceeds to send the message (260) to the contact.

A number of alternative determinations may occur in the described example of messaging application search function. As shown in the process 200, for example, at 215, the determination may be that a search indicator was not input into the input device and received by the messaging application. In this case, the determination at 215 is "NO," and the process 200 proceeds to 230, where a determination of whether the send button was selected by the user is made. If the determination at 230 is "NO", the process 200 proceeds back to 210 to receive an input from the input device.

Another alternative determination may be made at 240, where the process steps that occur when a user selects a search result for incorporation into a message (i.e., a "YES" determination) was previously described. If at 240, the determination is "NO," a user has not selected a search result, the process 200 may proceed to 210, and the messaging app waits for an input from the input device.

In the event that a user decides to discontinue initiation of the search or abandon the search (for any reason), a button may be presented on a user interface, such as with the search bar 351, or the mobile device may respond to a gesture, such as a shake of the mobile device or some form of a swipe/touch gesture, to cancel the search function and return to the message.

The foregoing described an example of a messaging application incorporating a search function. The advantageous example allows a user to quickly perform a search without leaving the messaging application. The benefits provided by such a feature is the saving of time, not having to interact in two different applications (i.e., messaging application and search application), or quickly being able to add further content to a message, which, for example, increases the entertainment value of the message or also provides additional information useful to the contact, such as directions to a business meeting or restaurant.

As mentioned above, after the messaging application parses the characters input (i.e., input character string) via the input device, determines that a search function indicator was input, and performs the search as described at steps 215, 220, 222, and 224 of FIG. 2, the search application may generate suggested searches based on history (stored in the mobile device memory) or obtained from the network. The suggested search terms are presented by the messaging application on the display device. FIG. 3B illustrates an example of a screen of the messaging application presenting suggested search terms based on the input of search terms in the example illustrated in FIG. 3A. In the example of FIG. 3B, the mobile device 300 includes the display 310, the thread portion 340, and a search bar 351. The search bar 351 replaces the dialogue box 350 when a search function indicator is detected in the dialogue box 350 by the messaging application.

As search terms are entered in the search bar 351, a list of suggested searches is presented in a menu that drops down in front of the keyboard 370. If after a predetermined amount of time, one of the suggested search terms is not selected the menu may no longer be presented, and a user will have access to the keyboard 370 to allow for additional inputs. Conversely, if one of the suggested search terms is selected by the user, the selected search term may be provided to the search application. A user may select a suggested search term for search by touching or scrolling to (e.g., using hard keys (not shown) on the mobile device or some other feature of the mobile device) the particular suggested search term. In response to the selection, the messaging application may pass the selected search term to the search application, or may present the selected search term alone in the search bar 351 in which case the user sends the search term to the search application by selecting the search button 399.

In addition to the dialogue box 350 changing function, the "Send" button 354 shown adjacent to the dialogue box 350 in FIG. 3A may transition, functionally and in appearance, into a "SEARCH" button 399. For example, when the SEARCH button 399 is selected, the messaging application forwards selected search terms or, as a default the search terms that appear in the search bar 351 location, to the search application 120.

The messaging application upon receipt of the search results from the search application may populate a search results menu with, for example, the top 10-15 search results, or all of the search results if less than 10 search results. The number of search results may be set by the user as a user preference of the messaging app. As shown in search results box 351, the search results may be presented as a menu with the most relevant shown at the top of the search results box 351 and with the least relevant of the top 10-15 search results shown at the bottom of the menu. In the touchscreen display, the user may touch a particular search result. In response to the touch, additional information related to the search result may be shown, such as a file location, a uniform resource locator (URL), file type (e.g., .jpeg, .gif, .docx, or the like), file size, or some other information related to the search result.

Figure 3C:
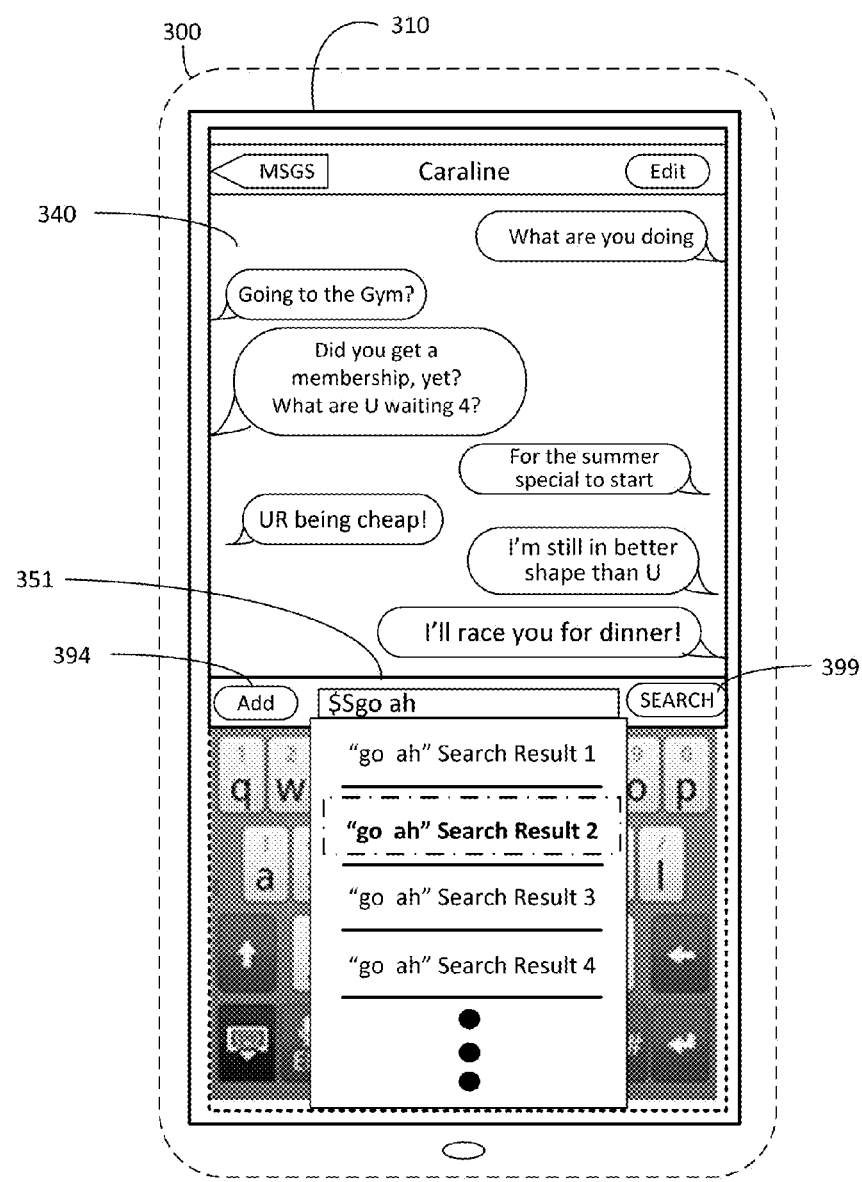
FIG. 3C is yet another example of a screen presentation generated by an example of the messaging application search service described herein.

Upon completion of the search, the search application returns search results to the messaging application, or directly to the search bar 351, and similar to the suggested search terms, presents a drop down menu of search results from which the user may select for incorporation into the body of the message being composed by the user. The user may be able to scroll through the menu of search results by swiping at the list, or using some other gesture or input to the mobile device (e.g., pressing a hard key, or using a voice command (e.g., "next")). A user may select one of the search results for incorporation into the message by selecting (e.g., by touching, placing a cursor over, scrolling to, or the like) the search result, or by highlighting and then selecting the "Add" button 394. For example, as shown in FIG. 3C, the "go ah" Search Result 2 is shown as highlighted and encircled.

As mentioned above, the user may select the highlighted Search Result 2 a subsequent time indicating the user's desire to incorporate the search result in the text message, or the user may select the Add button 394. In another example, multiple search results may be selected by using a combination of inputs, such as holding a hard button (e.g., a volume up/down button or the like (not shown in this example)) of the mobile device, and selecting additional search results. Or, in a different functional mode, a selection remains highlighted until deselected by a subsequent touch, and only by selecting the Add button 394 are the selected search result(s). Upon selection of a search result(s), the search bar 351 is replaced with the dialogue box 350, the Search button 399 replaced with the Send button 354, and the keyboard 370 is uncovered by the search results menu allowing the user to either input more characters or send the message to the contact (i.e., intended recipient(s)) by selection of the Send button 354.

Figure 3D:
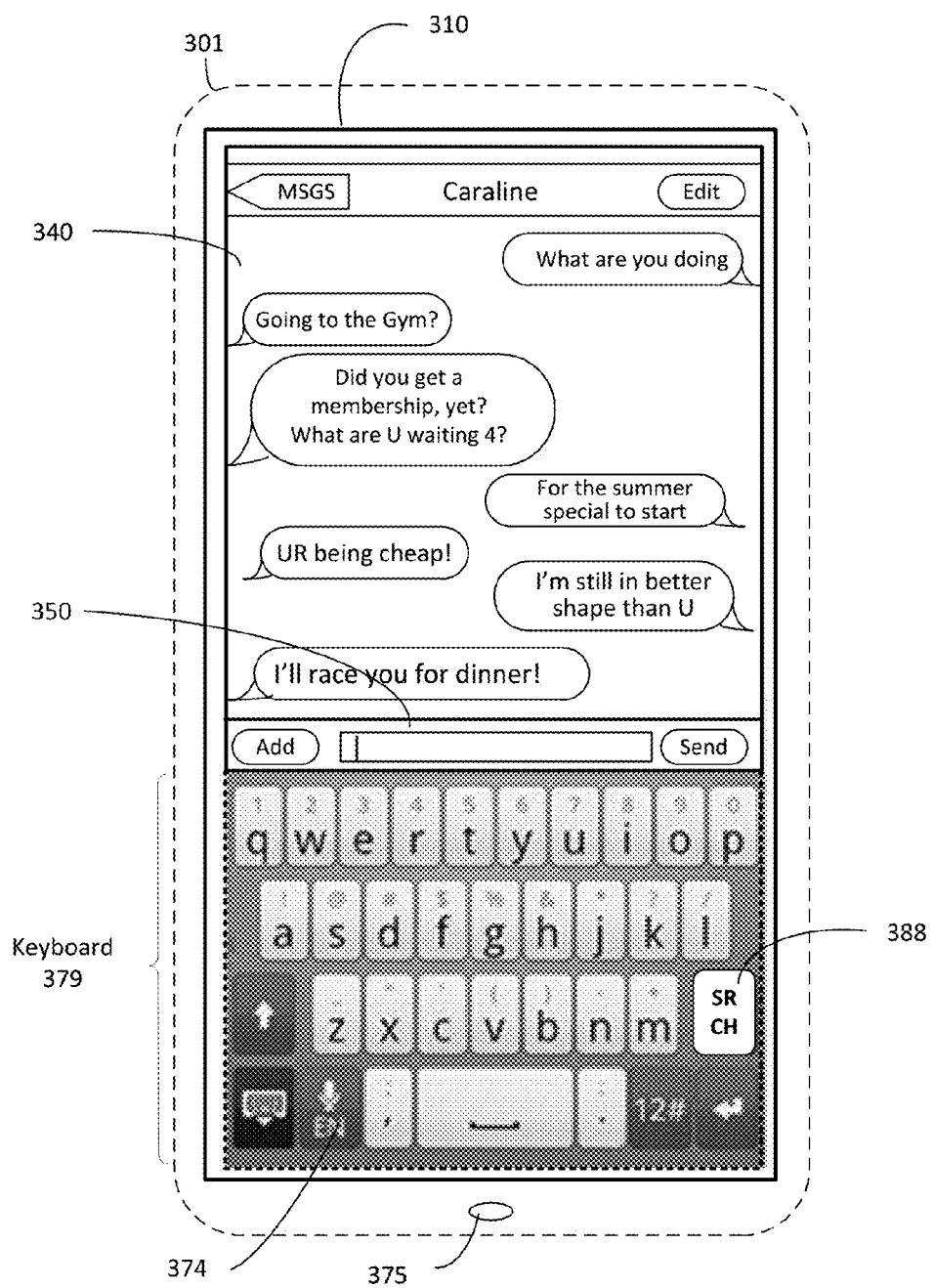
FIG. 3D is an example of a key on a virtual keyboard for implementing an example of the messaging application search service described herein.

Other examples of implementations for producing a search request are envisioned. FIG. 3D illustrates another example of a screen presentation generated by an example of the messaging search service described herein. In FIG. 3D, the mobile device 301 includes components similar to those available in mobile device 300, such as display device 310, thread portion 340, dialogue box 350, and microphone 375. The mobile device 301 of FIG. 3D differs from the mobile device 300 of FIGS. 3A and 3B by providing a keyboard 379 that includes an optional search "SRCH" key 388. The keyboard 379 still enables voice input via selection of key 374, but allows the user to input a search request with a selection of a key 388. In the operation of the example FIG. 3D, a user selects may begin composing a message to the intended message recipient (i.e., contact) and upon selection of the key 388 any characters in the dialogue box 350 will be used as a search term, or, alternatively, any characters added after the selection of the search key 388 will be used as the search term. Upon receipt of the search results, the dialog box 350 may transition into a search results menu 351 in a similar manner as discussed with respect to FIGS. 3A and 3B.

In yet another example, the messaging application may be configured to provide access directly to default or user preferred searched web sites or data storage locations. For example, a user may set in a user preferences menu associated with the messaging application a list of web sites or data storage locations, such as memory locations on the mobile device or in a cloud storage the user prefers to search or use to search. The cloud storage may be provided by a third-party cloud storage provider (e.g., Dropbox®) or a storage maintained by the MNO that is providing communications service to the user and the mobile device.

Figure 3E:
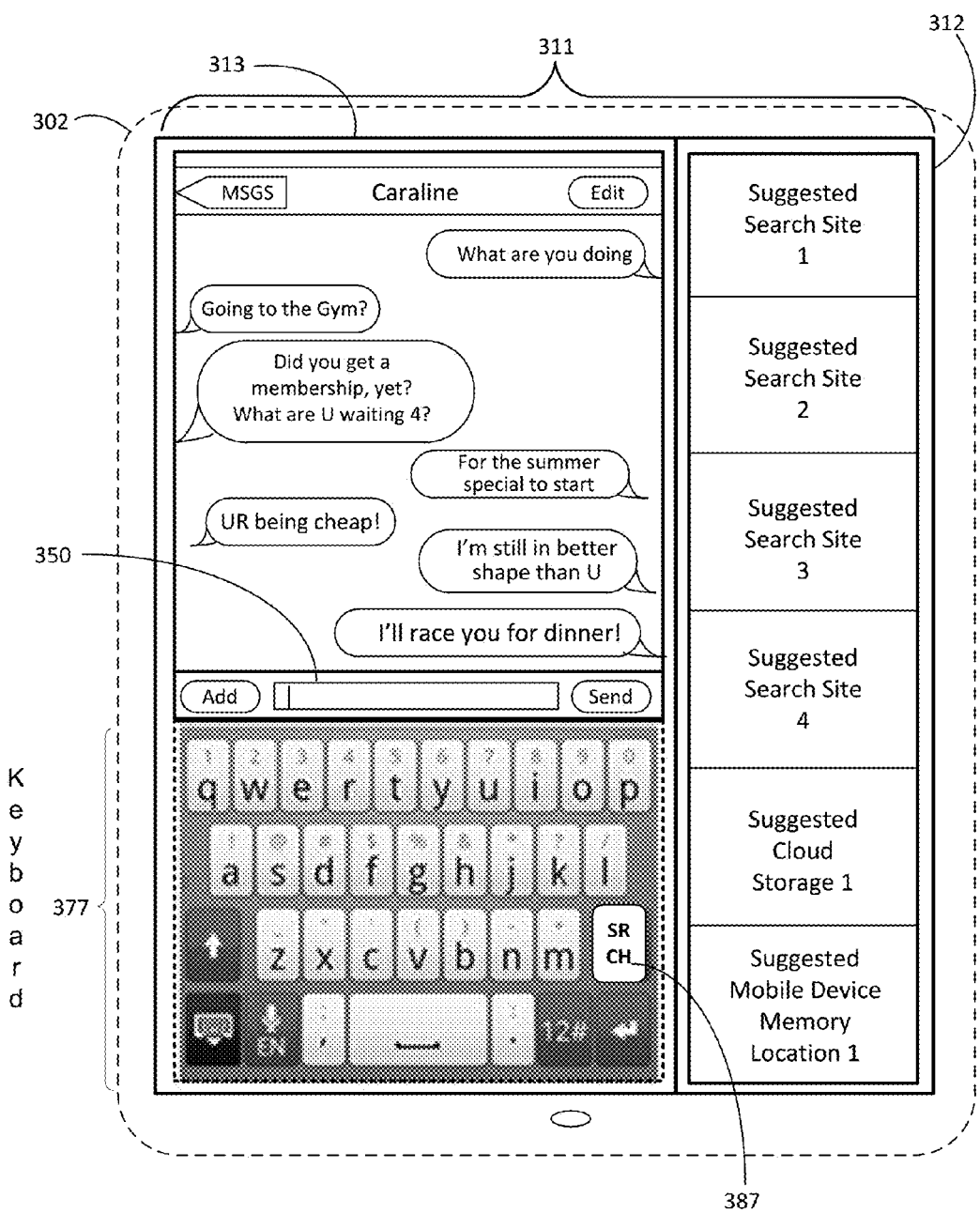
FIG. 3E is another example of a screen presentation generated by an example of the messaging application search service described herein.

FIG. 3E is an example of yet another implementation of messaging search service described herein. The example of FIG. 3E provides a mobile device 302 that has a display screen 311 that is initially configured in the same manner as the display 310 in FIG. 3A. However, when the search "SRCH" key is selected, which is interpreted as the user is requesting to search for content to use in a messaging conversation, the messaging application automatically subdivides the display screen 311. Or, said differently, when a specified key ((e.g., the search button or key 387) is selected, the messaging application responds by splitting the screen and calling a list of sites or locations to search. Although shown in FIG. 3D, as vertically oriented, the display may be subdivided in any direction (i.e., horizontal) or manner and a list of sites or locations, or group of icons representing the sites or locations, or the like is presented adjacent to the messaging application. For example, a first subdivision 313 of the display screen 311 provides the same information and functionality as the display 310 of FIG. 3C albeit on a reduced scale, and the other, or the second, subdivision 312 of the display screen provides a listing of suggested, or recommended, data sources through which the search application may be instructed to search. The second subdivision 312 allows the user to select from a number of web sites (such as suggested search sites 1-4), cloud storage sites (e.g., Suggested Cloud Storage 1), and/or mobile device memory locations, such as file locations (e.g., Suggested Mobile Device Memory Location 1), that may be used when a search is performed.

For example, one or more of the suggested search options, such as suggested search sites 1-4, may be presented based on user preference settings, or by frequency of use (e.g., the user frequently goes to a specific web site for news, weather, sports scores or the like. As a result, the particular web site may be suggested as a suggested search site. Alternatively, the suggested search site may be suggested based on the specific type of content that the web site provides. For example, specific web sites may be suggested that provide video content (e.g., Youtube®), images (e.g., known search engines), articles (e.g., an electronic encyclopedia or subscription-based subject matter database), or trending articles (e.g., news outlets, news aggregators, blogs and the like). Of course, a default selection of suggested search sites may be provided by the MNO or the mobile device manufacturer.

In addition, other locations than web sites may be offered in the second subdivision 312. The other locations may be set, for example, according to the messaging application user preferences. For example, a user's cloud storage may also contain content that the user may wish to add to a message. Or, the user may also store content in the mobile device 302 memory locations (not shown in this example) that the user may wish to add to a message. Upon selection of a suggested search location or site, the dialogue box 350 may be converted into a search bar in which search results may be presented, such as search bar 351. For example, when the dialogue box 350 is converted to the search bar 351, the inputs from the input device (such as keyboard 370) are no longer supplied to the messaging application but may instead be provided directly to the search application. Alternatively, the messaging application may still receive the inputs from the input device but may simply pass the inputs to the search application.

After selection of a search site or location and the dialogue box 350 is converted into a search bar 351, the user may input characters via an input device, such as keyboard 377, to input search terms for performing a search. The results of the search may be presented to the user as illustrated and described with respect to FIG. 3C. Also, as described with respect to FIG. 3C, the user may select a search result for incorporation into the message being composed. After incorporation of the search result into the message, or immediately upon selection of the Add button 394, the split screen 311 is replaced with the screen 313 of the first subdivision.

One of the benefits of the described examples is the ability to search for content on the Internet, in the mobile device 300 memory, cloud storage accessible by the user, and/or storage provided by the MNO to which the user subscribes while operating within the mobile device. The determination of where the search application will search may be set according to user preferences for the messaging application. For example, the messaging application user preferences may have settings in which when the search application is set to connect directly to the Internet and use a search engine (such as Bing®, Google®, or the like.) Alternatively, the user preferences may include a setting in which a pallet of links are saved in the mobile device memory. The links may be addresses (i.e., URLs, mobile device file locations, cloud storage file locations, or a filename of a file containing the actual content) of content, such as emoticons, videos and/or images. For example, the links may be content that was tagged by the user, tagged by other users, tagged by a service used by the user, or the like. Alternatively, the user preferences may indicate a combination of links and external (to the mobile device memory) content that is to be searched in response to a messaging application search request. For example, a scenario is envision in which the search application, in response to a search request from the messaging application, initially searches using a search term(s) associated with the search request the mobile device memory to access the local list of links. The local list of links is more readily accessible than content accessible through the mobile communication network and/or a data communication network. After the search application searches through the more readily available content links in the mobile device memory, the search application proceeds to search based on the search terms for matching content available via the mobile communication network and/or a data communication network.

The search suggestions discussed above with reference to FIG. 3B may also be obtained from a list of previously searched search terms that is stored in the mobile device memory. For example, a person may be searching for the lyrics to the song 'My Girl', so the first search term is the letter "m." The search application, in an example in which search suggestions are provided as the user inputs search terms, may access a list of tagged items (e.g., links, images and the like) in the mobile device memory to locate tagged items that match the letter "m," and populates the search bar with the matching tagged item. Continuing with this example, the search application may present a tagged item labeled as "maytag neptune dryer for sale used", which may have been previously searched and stored in the mobile device memory. Other remaining suggestions may be taken from the default search engine results obtained from the Internet, such as for example, "mac tech business", "mac tech support", or the like. The search suggestions displayed in the dialogue box 350 are therefore a combination of a local mobile device memory search and an Internet search.

It may be useful to consider the functional elements/aspects of an exemplary mobile device 13b, at a high-level.

The mobile devices 13b of users of the messaging application search service also can receive and execute applications written in various programming languages, as discussed above. Mobile device 13b can take the form of portable handsets, smart-phones or personal digital assistants, although they may be implemented in other form factors. Program applications, including an application to assist in the messaging application search service can be configured to execute on many different types of mobile devices. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

A mobile device 13b, shown as MD 105 in FIG. 1, communicates over the air with a base device (not shown) coupled to the mobile communication network 140 for various voice and data communications, e.g. through the data communication network (e.g., the Internet) 160 with one or more servers 165. If a MNO offers the messaging application search service, the service may be supported by a MNO data server 150, for communication via the networks 140 and 160. Alternatively, the messaging application search service may be provided by a separate entity (alone or through agreements with the carrier), in which case, the service may be hosted on an application server such as data servers 165 connected for communication via the networks 140 and 160. Server such as 165 and 150 may provide any of a variety of common application or service functions in support of or in addition to an application program running on the mobile device 136. However, for purposes of further discussion, we will focus on functions thereof in support of the mobile messaging application search service. For a given service, including the messaging application search service, an application program within the mobile device may be considered as a 'client' and the programming at 165 or 150 may be considered as the 'server' application for the particular service.

The messaging application search service under consideration here may be delivered to touch screen type mobile devices as well as to non-touch type mobile devices. Hence, our simple example shows the mobile device 13b as a touch screen type mobile device. Implementation of the messaging application search service will involve at least some execution of programming in the mobile devices as well as implementation of user input/output functions and data communications through the network 140, from the mobile device 13b.

For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the device 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 410. The transceiver may also support various types of mobile messaging services, such as short message service (SMS), enhanced messaging service (EMS) and/or multi-media messaging service (MMS).

The mobile device 13b may also include an additional radio transceiver, such as Wi-Fi transceiver 119 with a separate antenna 117, which communicates with a digital communication network, such as data communication network 160 via access point 163. The radio transceiver 119 may operate according one or more of the IEEE 802.11 standards or the like. The radio transceiver 119 may be communicatively coupled to the microprocessor 112 and transmit signals based on control and data signals provided by the microprocessor 112.

The microprocessor 112 serves as a programmable controller for the mobile device 13b, in that it controls all operations of the mobile device 13b in accord with programming that it executes, for all normal operations, and for operations involved in the messaging application search service under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Hence, outlined above, the mobile device 13b includes a processor, and programming stored in the flash memory 114 configures the processor so that the mobile device is capable of performing various desired functions, including in this case the functions involved in the technique for providing messaging applications and search applications. For example, the above referenced tagged links that identify content for incorporation into a composed message be stored in the flash memory 114.

A processor is a circuit having elements structured and arranged to perform one or more processing functions, typically various data processing functions. Although discrete logic components could be used, the examples utilize components forming a programmable central processing unit (CPU). A microprocessor, such as microprocessor 112, includes one or more integrated circuit (IC) chips incorporating the electronic elements to perform the functions of the CPU. The microprocessor 112, for example, may be based on any known or available microprocessor architecture, such as a Reduced Instruction Set Computing (RISC) using an ARM architecture, as commonly used today in mobile devices and other portable electronic devices.

The flash memory 114 may also contain programming that when executed by the microprocessor 112 provides a voice recognition function that is used to control the mobile device 13b. For example, as mentioned above, the voice recognition function, when selected by a user, may be used to populate the messaging application dialogue box or search bar, or may be used to select a suggested search term or search result presented on the display device 122. Voice commands may include, "up", "down", "select", "add" and "search", for example.

Figure 4:
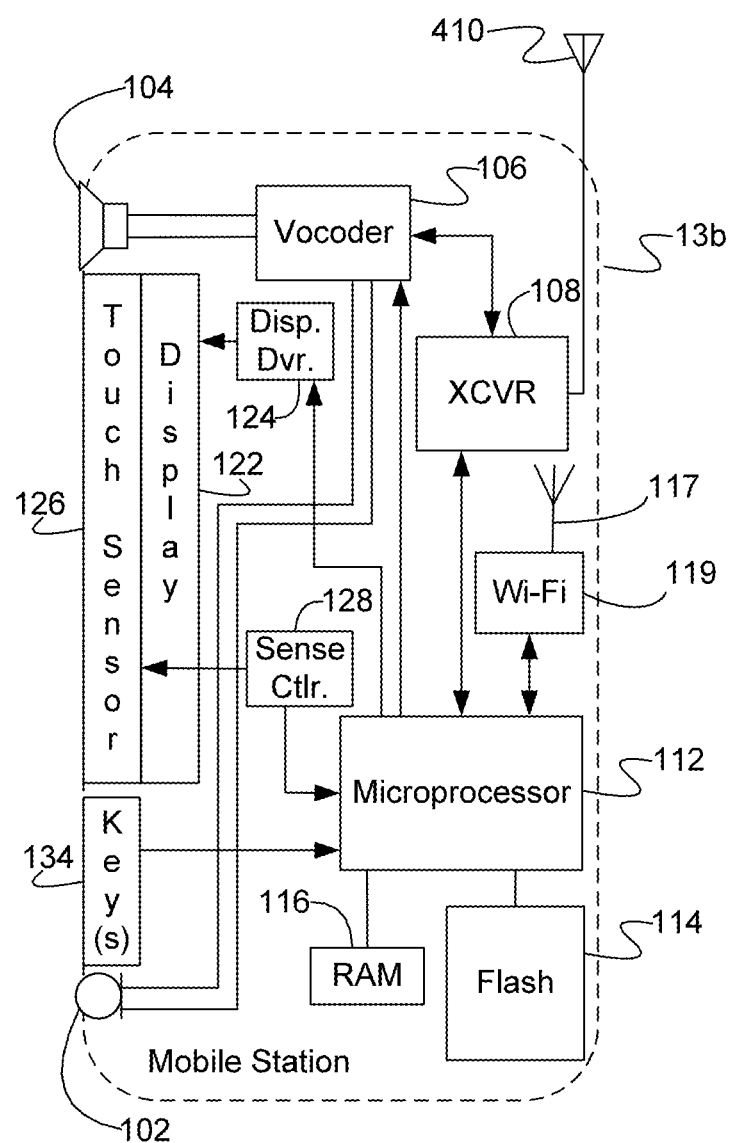
FIG. 4 is a high-level functional block diagram of an exemplary touch screen type mobile device as may utilize the messaging search service through a network/system like that shown in FIG. 1.

In the example of FIG. 4, the user interface elements included a display and a keypad (keys). The mobile device 13b may have a limited number of keys 134, but the user interface functions of the display and keypad are replaced by a touchscreen display arrangement. At a high level, a touch-screen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 13*b* includes a display 122, which the microprocessor 112 controls via a display driver 124, to present visible outputs to the device user. The mobile device 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 134, if included) are the physical elements providing the textual and graphical user interface for the mobile device 13*b*. The microphone 102 and speaker 104 may be used as additional user interface elements, for audio input and output, including with respect to some messaging application and search application related functions.

The structure and operation of the mobile device 13*b*, as outlined above, was described to by way of example, only.

As shown by the above discussion, functions relating to the enhanced user experience for the messaging application search service, via a graphical user interface of the messaging application, may be implemented on computers connected for data communication via the components of a packet data network, operating as a data server as shown in FIG. 1.

Hence, aspects of the methods of messaging application search service outlined above may be embodied in programming, e.g. from execution by a mobile device and/or at a server. Program aspects of the technology may be thought of as "products" or "articles of manufacture" typically in the form of executable code and/or associated data that is carried on or embodied in a type of machine readable medium. Executable code, for example, may take the form of software, firmware, or microcode of the type suitable for execution by the particular processor hardware of the mobile device, other user terminal device or server platform, so as to configure the respective equipment to perform functions like those discussed herein.

"Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the MNO into the computer platform of the mobile device that will be the messaging application and search application. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the messaging application search function, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device for improving identification of multimedia content for inclusion in a messaging conversation, comprising:
   a memory; and
   a processor, coupled to the memory, to:
      provide, for display, a messaging application user interface of a messaging application,
         the messaging application being for one or more of instant messages, short messaging service (SMS) messages, enhanced messaging service (EMS) messages, or multimedia message service (MMS) messages, and
         the messaging application user interface comprising a text entry box, a submit button, and a messaging conversation display region;
      receive, in the text entry box, a text input;
      determine, using the messaging application, that the text input includes a search function indicator;
      replace, based on determining that the text input includes the search function indicator, the submit button with a search button;
      invoke, based on receiving a selection of the search button, a search application provided by the mobile device;
      provide one or more search terms, determined from the text input, to the invoked search application;
      identify, after providing the one or more search terms, one or more search results based on the search application using a particular search engine to search the Internet,
         the particular search engine being previously selected by a user of the mobile device;
      provide, for display, a menu of the one or more search results in the messaging application user interface,
         the one or more search results including a particular search result for the multimedia content;
      receive information identifying a selection of the particular search result from the menu of the one or more search results;
      incorporate, based on the information identifying the selection of the particular search result, the multimedia content, of the particular search result, into a portion of the text input received in the text entry box of the messaging application user interface; and
      replace the search button with the submit button in the messaging application user interface.

2. The mobile device of claim 1, wherein the processor is further to:
   replace the text entry box of the messaging application user interface with a search bar; and
   provide, for display, the one or more search results in the search bar.

3. The mobile device of claim 1, wherein the processor is further to:
   determine that the search function indicator was received by parsing the text input to identify the search function indicator or by identifying the text input as a selection of a search key.

4. The mobile device of claim 1, wherein the processor is further to:
   provide, for display, the one or more search terms in a search bar;
   receive search suggestions from the search application; and
   provide, for display, the received search suggestions in a menu in the search bar.

5. The mobile device of claim 4, wherein the processor is further to:
   receive information identifying a selection of a search suggestion from the menu of the received search suggestions; and
   provide, based on the selection of the search suggestion, the search suggestion to the search application.

6. The mobile device of claim 1, wherein, when incorporating the multimedia content, the processor is to:
   receive, after receiving the information identifying the selection of the particular search result, an input to add the particular search result to the portion of the text input received in the text entry box of the messaging application user interface, and
   incorporate the multimedia content based on the input.

7. The mobile device of claim 1, wherein the processor is further to:
   retrieve data related to the one or more search terms from the memory; and
   provide, for display, the retrieved data as a search suggestion in the messaging application user interface.

8. The mobile device of claim 1, wherein the search function indicator comprises at least one of:
   one or more characters selected by the user for the search function indicator, or
   one or more symbols selected by the user for the search function indicator.

9. A method for improving identification of multimedia content for inclusion in a messaging conversation, comprising:

providing, by a mobile device and for display, a messaging application user interface of a messaging application,
the messaging application being for one or more of instant messages, short messaging service (SMS) messages, enhanced messaging service (EMS) messages, or multimedia message service (MMS) messages, and
the messaging application user interface comprising a text entry box, a submit button, and a messaging conversation display region;
receiving, by the mobile device and in the text entry box, a text input;
determining, by the mobile device and using the messaging application, that the text input includes a search function indicator;
replacing, by the mobile device and based on determining that the text input includes the search function indicator, the submit button with a search button;
invoking, by the mobile device based on receiving a selection of the search button, a search application provided by the mobile device;
providing, by the mobile device, one or more search terms to the invoked search application;
identifying, by the mobile device and after providing the one or more search terms, one or more search results based on the search application using a particular search engine to search the Internet,
the particular search engine being previously selected by a user of the mobile device;
providing, by the mobile device and for display, a menu of the one or more search results in the messaging application user interface,
the one or more search results including a particular search result for the multimedia content;
receiving, by the mobile device, information identifying a selection of the particular search result from the menu of the one or more search results;
incorporating, by the mobile device and based on the selection of the particular search result, the multimedia content, of the particular search result, into a portion of the text input received in the text entry box of the messaging application user interface; and
replace the search button with the submit button in the messaging application user interface.

10. The method of claim 9, further comprising:
determining that the search function indicator was received by parsing the text input to identify the search function indicator or by identifying an input as a selection of a search key; and
replacing the text entry box with a search bar in the messaging application user interface.

11. The method of claim 9, further comprising:
providing, for display, the one or more search terms in a search bar;
receiving search suggestions from the search application; and
providing, for display, the received search suggestions in a menu in the search bar.

12. The method of claim 11, further comprising:
receiving information identifying a selection of a search suggestion from the menu of the search suggestions; and
providing, based on the selection of the search suggestion, the search suggestion to the search application.

13. The method of claim 9, further comprising:
receiving search suggestions from the search application; and
providing, for display, the received search suggestions in the messaging application user interface.

14. The method of claim 9, wherein incorporating the multimedia content comprises:
receiving, after receiving the information identifying the selection of the particular search result, an input to add the particular search result to the portion of the text input received in the text entry box of the messaging application user interface, and
incorporating the multimedia content based on the input.

15. A non-transitory computer-readable medium storing instructions for improving identification of multimedia content for inclusion in a messaging conversation, the instructions comprising:
one or more instructions that, when executed by a processor, cause the processor to:
provide, for display, a messaging application user interface of a messaging application,
the messaging application being for one or more of short messaging service (SMS) messages, enhanced messaging service (EMS) messages, or multimedia message service (MMS) messages, and
the messaging application user interface comprising a text entry box, a submit button, and a messaging conversation display region;
receive, in the text entry box, a text input;
determine, using the messaging application, that the text input includes a search function indicator;
replace, based on determining that the text input includes the search function indicator, the submit button with a search button,
invoke, based on receiving a selection of the search button, a search application provided by a mobile device;
provide one or more search terms, determined from the text input, to the invoked search application;
identify, after providing the one or more search terms, one or more search results based on the search application using a particular search engine to search the Internet,
the particular search engine being previously selected by a user of the mobile device;
provide, for display, a menu of the one or more search results in the messaging application user interface,
the one or more search results including a particular search result for the multimedia content;
receive information identifying a selection of the particular search result from the menu of the one or more search results;
incorporate, based on the information identifying the selection of the particular search result, the particular search result into a portion of the text input received in in the text entry box of the messaging application user interface; and
replace the search button with the submit button in the messaging application user interface.

16. The non-transitory computer-readable medium of claim 15, wherein the instructions further comprise:
one or more instructions that, when executed by the processor, cause the processor to:
determine that the search function indicator was received by parsing text inputs to the messaging application user interface to identify the search function indicator or by identifying an input as a selection of a search key.

17. The non-transitory computer-readable medium of claim 15, wherein the instructions further comprise:
one or more instructions that, when executed by the processor, cause the processor to:
receive search suggestions from the search application based on providing the one or more search terms to the search application; and
provide, for display, the received search suggestions.

18. The non-transitory computer-readable medium of claim 17, wherein the instructions further comprise:
one or more instructions that, when executed by the processor, cause the processor to:
identify a selection of a search suggestion from the received search suggestions; and
provide, based on the selection of the search suggestion, the search suggestion to the search application.

19. The non-transitory computer-readable medium of claim 17, wherein the search function indicator is based on one or more preferences selected by the user.

20. The non-transitory computer-readable medium of claim 15, wherein the one or more instructions to incorporate the particular search result comprise:
one or more instructions that, when executed by the processor, cause the processor to:
receive, after receiving the information identifying the selection of the particular search result, an input to add the particular search result to the portion of the text input received in the text entry box of the messaging application user interface, and
incorporate the particular search result based on the input.

* * * * *